(12) United States Patent
Caleman, Jr.

(10) Patent No.: US 11,097,882 B2
(45) Date of Patent: Aug. 24, 2021

(54) FINGER-PROOF LABELS FOR PACKAGES

(71) Applicant: Bemis Company, Inc., Neenah, WI (US)

(72) Inventor: Reinaldo V. Caleman, Jr., Neenah, WI (US)

(73) Assignee: Bemis Company, Inc., Neenah, WI (US)

( * ) Notice: Subject to any disclaimer, the term of this patent is extended or adjusted under 35 U.S.C. 154(b) by 52 days.

(21) Appl. No.: 16/349,114

(22) PCT Filed: Nov. 14, 2017

(86) PCT No.: PCT/US2017/061514
§ 371 (c)(1),
(2) Date: May 10, 2019

(87) PCT Pub. No.: WO2018/089991
PCT Pub. Date: May 17, 2018

(65) Prior Publication Data
US 2019/0270567 A1 Sep. 5, 2019

Related U.S. Application Data

(60) Provisional application No. 62/421,504, filed on Nov. 14, 2016, provisional application No. 62/488,371, filed on Apr. 21, 2017.

(51) Int. Cl.
*B65D 75/58* (2006.01)
*B32B 7/12* (2006.01)
(Continued)

(52) U.S. Cl.
CPC ............ *B65D 75/5838* (2013.01); *B32B 7/06* (2013.01); *B32B 7/12* (2013.01); *B32B 27/08* (2013.01);
(Continued)

(58) Field of Classification Search
CPC .. B32B 7/12; B32B 7/06; B32B 27/32; B32B 27/306; B32B 27/08; B32B 2519/00;
(Continued)

(56) References Cited

U.S. PATENT DOCUMENTS

| 4,320,158 A | 3/1982 | Seeley |
| 4,679,693 A | 7/1987 | Forman |

(Continued)

FOREIGN PATENT DOCUMENTS

| AU | 664819 | 11/1995 |
| WO | 2016044381 A1 | 3/2016 |
| WO | 2016060846 A1 | 4/2016 |

*Primary Examiner* — Patricia L. Nordmeyer

(57) ABSTRACT

A package label is described. The package label comprises a first ply, a second ply, and a first edge. The second ply comprises a pull tab comprising a first boundary adjacent the first edge, a second boundary opposing the first boundary, and a first adhesive deadener area. The second ply also comprises a first line of weakness adjacent the second boundary and positioned apart from the first adhesive deadener area. The first line of weakness is linear. The second ply further comprises a first stopping feature adjacent a first end of the first line of weakness and a second stopping feature adjacent a second end of the first line of weakness. Various embodiments of the package label are also described.

20 Claims, 5 Drawing Sheets

(51) Int. Cl.
   *B65D 77/20*   (2006.01)
   *G09F 3/10*    (2006.01)
   *G09F 3/02*    (2006.01)
   *B32B 27/08*   (2006.01)
   *B32B 7/06*    (2019.01)
   *B32B 27/30*   (2006.01)
   *B32B 27/32*   (2006.01)

(52) U.S. Cl.
   CPC ............ *B32B 27/306* (2013.01); *B32B 27/32* (2013.01); *B65D 77/2096* (2013.01); *B32B 2307/7244* (2013.01); *B32B 2519/00* (2013.01); *B65D 2575/586* (2013.01); *B65D 2577/2041* (2013.01); *B65D 2577/2075* (2013.01); *B65D 2577/2091* (2013.01); *G09F 3/10* (2013.01); *G09F 2003/0222* (2013.01); *G09F 2003/0272* (2013.01); *Y10T 428/1476* (2015.01)

(58) Field of Classification Search
   CPC ........ B32B 2307/7244; B65D 77/2096; B65D 75/5838; B65D 2519/00; B65D 2575/586; B65D 2577/2091; G09F 2003/0222; G09F 2003/0272; G09F 3/10
   See application file for complete search history.

(56) References Cited

U.S. PATENT DOCUMENTS

| | | |
|---|---|---|
| 4,723,301 A | 2/1988 | Chang |
| 5,042,653 A | 8/1991 | Ems |
| 5,716,688 A | 2/1998 | Burke et al. |
| 6,309,105 B1 | 10/2001 | Palumbo |
| 6,428,867 B1 | 8/2002 | Scott et al. |
| 6,589,622 B1 | 7/2003 | Scott |
| 6,918,532 B2 | 7/2005 | Sierra-Gomez et al. |
| 7,344,744 B2 | 3/2008 | Sierra-Gomez et al. |
| 7,371,008 B2 | 5/2008 | Bonenfant |
| 7,681,732 B2 | 3/2010 | Moehlenbrock et al. |
| 7,963,413 B2 | 6/2011 | Sierra-Gomez et al. |
| 8,312,655 B2 | 11/2012 | Liu et al. |
| 8,408,792 B2 | 4/2013 | Cole et al. |
| 8,545,099 B2 | 10/2013 | Davis et al. |
| 8,746,483 B2 | 6/2014 | Sierra-Gomez et al. |
| 8,814,218 B2 | 8/2014 | Liu et al. |
| 9,090,383 B2 | 7/2015 | Forman et al. |
| 9,150,342 B2 | 10/2015 | Sierra-Gomez et al. |
| 9,278,783 B2 | 3/2016 | Emmott |
| 9,422,080 B2 | 8/2016 | Tinoco et al. |
| 9,475,615 B2 | 10/2016 | Schiermeier et al. |
| 9,533,813 B1 | 1/2017 | Conrad |
| 9,676,537 B2 * | 6/2017 | Fenech, III ............ B32B 27/08 |
| 2004/0112010 A1 | 6/2004 | Richards et al. |
| 2010/0147724 A1 | 6/2010 | Mitra-Shah et al. |
| 2011/0126439 A1 | 6/2011 | Liu et al. |
| 2012/0128835 A1 | 5/2012 | Lyzenga et al. |
| 2012/0177307 A1 | 7/2012 | Duan et al. |
| 2014/0048438 A1 | 2/2014 | Woo |
| 2014/0185965 A1 | 7/2014 | Lyzenga |
| 2015/0117797 A1 | 4/2015 | Cigallio et al. |
| 2015/0151872 A1 | 6/2015 | Schofield et al. |
| 2015/0239619 A1 | 8/2015 | Daffner et al. |
| 2016/0096667 A1 | 4/2016 | Huffer |
| 2016/0221740 A1 | 8/2016 | Tinoco |
| 2017/0021974 A1 | 1/2017 | Lemmons et al. |
| 2017/0073136 A1 | 3/2017 | Konicke |

* cited by examiner

FINGER-PROOF LABELS FOR PACKAGES

The present application relates generally to labels for packaging for various products. More particularly, the present application relates to finger-proof labels for packages for food and non-food products.

BACKGROUND

The use of labels for accessing or repeatedly accessing the contents of a package are known. For example, U.S. Pat. No. 4,679,693 (Forman) discloses a resealable container with a tearable face that is opened and resealed by a label. The label includes multiple layers and, for tamper evidence, requires that an end-user remove a layer covering or overlaying a pull tab in order to operationally access the label to open the package.

Other forms of tamper-evidence have been integrated into packaging films. For example, U.S. Pat. No. 7,681,732 (Moehlenbrock et al.) discloses a laminated lidstock comprising a substrate film, a support film, a pressure sensitive adhesive disposed between the substrate film and the support film, a first die cut in the substrate film, a second die cut in the support film, a pull tab, and a tamper evidence device. To open the package, an end-user must remove the tamper evidence device (i.e., a first end portion of the support film) from the substrate film in order to access the pull tab which the end-user may then use to peel back the support film. The tamper evidence is indicated when printed indicia is revealed upon removal of the end portion of the support film from the substrate film. The package requires printing indicia in registration on the surface of the substrate film.

As a further example, US Publication 2015/0117797 (Cigallio et al.) discloses tamper-indicating elements for flexible, reclosable packages. Such tamper-indicating elements include one or more self-terminating shapes with an open geometry or a closed geometry that forms one or more chads after initial opening of the package. The chads transfer from one film to another film. The self-terminating shapes indicate whether or not the package has been opened or otherwise accessed.

SUMMARY

What is needed is an opening feature that does not simply indicate access or tampering but that actually prevents access or tamper by a finger, pen, needle, or other object slid underneath a pull tab. Embodiments of the present application include finger-proof labels and peelable/resealable finger-proof labels. Such labels may be sealed to packages comprising a package body such as, as a non-limiting example, a tray having a top portion, a bottom portion, and side portions connecting the bottom portion to the top portion. In such embodiment, the finger-proof label may be sealed to the top portion (such as, as a non-limiting example of a top portion, a perimeter flange) of package body. In other embodiments, the finger-proof label may be combined with other various packaging configurations, including but not limited to bags, pouches, stand-up pouches, quad pouches, over-wraps, lidding film, rigid or semi-rigid thermoformed trays, vacuum packages, vacuum skin packaging, or the like. In the various embodiments, the finger-proof label comprises an unsealed pull tab and a finger-proof feature to prevent access to or tamper with the package contents prior to an end-user desiring to access the contents.

According to one embodiment, the finger-proof label includes a linear or mostly linear slit or cut or line of weakness proximate or otherwise adjacent the unsealed pull tab. This prevents a finger or other object from being slid underneath the pull tab in an attempt to access or tamper with the package contents.

In some embodiments, the slit or line of weakness may allow the unsealed pull tab to function as a handle to allow an end-user to easily grasp the unsealed pull tab and peel the label to open the package to which the package label is attached. In some embodiments, such as, as a non-limiting example, when the label is sealed to the perimeter flange of a tray, upon peeling the label from the tray to open the package (but not necessarily fully removing the label from the tray), the slit or line of weakness may be hooked on the opposite end of the tray (i.e., the end opposite the end at which the unsealed pull tab and slit were located in the unopened state) to hold open the label to provide easy access to the package contents.

The finger-proof label may include a monolayer film or a multilayer film, depending upon the requirements of a particular packaging application. Film layers may include but are not limited to oxygen barrier layers, moisture barrier layers, chemical barrier layers, abuse layers, tie or adhesive layers, bulk layers, odor scavenging layers, or oxygen scavenging layers. It is contemplated that the packages or package bodies may be formed from many different materials such as, as non-limiting examples, thermoplastics, papers, non-woven materials, metal foils, or combinations of such. In some embodiments, the packages may include oxygen barrier film and may have an oxygen transmission rate ($O_2$TR) value of less than or equal to 10 cm/100 $in^2$/24 hours at 1 atmosphere, 23° C., and 0% relative humidity.

The finger-proof label may be formed from any thermoplastic material including but not limited to polyolefin polymers such as polyethylene, ethylene copolymers, or polypropylene; polyamide; polyethylene terephthalates; or combinations of such. In some embodiments, the label may include an oxygen barrier material or a moisture barrier material. The label may use an exposed area of pressure sensitive adhesive or other removable adhesive to peelably reseal the label to a package body. In some embodiments, the label may comprise a pattern-applied coating of pressure sensitive adhesive; in other embodiments, the label may comprise a coextensive layer of pressure sensitive adhesive. In some embodiments, the label may comprise a layer of pressure sensitive adhesive and an oxygen barrier layer. In some embodiments, the label may comprise a layer of pressure sensitive adhesive and an abuse layer. In some embodiments, the label may comprise a pressure sensitive adhesive layer and any number of additional layers depending upon the requirements of a particular packaging application.

Specifically, in a first set of embodiments, this package label has a first ply, a second ply, and a first edge. The second ply has a pull tab that has a first boundary adjacent the first edge of the package label, a second boundary opposing the first boundary, and a first adhesive deadener area. In some embodiments of the first set of embodiments, the first boundary of the pull tab is positioned at an approximate center of the first edge. In the first set of embodiments, the second ply also has a first line of weakness adjacent the second boundary of the pull tab and positioned apart from the first adhesive deadener area. In some embodiments of the first set of embodiments, the second ply further has a series of lines of weakness directly adjacent the first line of weakness and positioned on a side of the first line of weakness opposite the second boundary. In the first set of embodiments, the first line of weakness is linear. A first stopping feature is adjacent a first end of the first line of weakness, and a second stopping feature is adjacent a second end of the first line of weakness. In some embodiments of the first set of embodiments, the first line of weakness is continuous from the first end to the second end. In some embodiments of the first set of embodiments, each of the first stopping feature and the second stopping feature is curved shape and each curves towards the pull tab.

In some embodiments of the first set of embodiments, the package label is adapted to prevent an object from being slid underneath the pull tab to access or tamper with contents of a package body.

In some embodiments of the first set of embodiments, each of the first ply and the second ply has multiple layers. In some of these embodiments, the second ply has a removable adhesive layer adapted to peelably reseal the package label to a package body. In some embodiments of the first set of embodiments, the first ply has a sealant layer adapted to seal the package label to a package body. In some embodiments of the first set of embodiments, the first ply has a second line of weakness.

In some embodiments of the first set of embodiments, the second ply further has a second adhesive deadener area adjacent the first stopping feature and a third adhesive deadener area adjacent the second stopping feature. In some of these embodiments, the package label is adapted to eliminate a chad at the first stopping feature and a chad at the second stopping feature when the package label is peeled from a package body.

In some embodiments of the first set of embodiments, a package includes the package label, and the package label is sealed to a package body. In some of these embodiments, the package body is a tray.

In a second set of embodiments, a package label has a first ply, a second ply, and a first edge. The second ply has a pull tab that has a first boundary adjacent the first edge of the package label, a second boundary opposing the first boundary, and a first adhesive deadener area. The second ply also has a first line of weakness adjacent the second boundary and positioned apart from the first adhesive deadener area. The first line of weakness is linear. A first stopping feature is adjacent a first end of the first line of weakness, and a second stopping feature adjacent a second end of the first line of weakness. In some embodiments of the second set of embodiments each of the first stopping feature and the second stopping feature is curved shape and each curves towards the pull tab. In the second set of embodiments, a second adhesive deadener area is adjacent the first stopping feature, and a third adhesive deadener area is adjacent the second stopping feature.

In some embodiments of the second set of embodiments, the package label is adapted to prevent an object from being slid underneath the pull tab to access or tamper with contents of a package body.

In some embodiments of the second set of embodiments, the package label is adapted to eliminate a chad at the first stopping feature and a chad at the second stopping feature when the package label is peeled from a package body.

In some embodiments of the second set of embodiments, the first ply has a second line of weakness.

In some embodiments of the second set of embodiments, a package includes the package label, and the package label is sealed to a package body.

DETAILED DESCRIPTION

Figure 1:
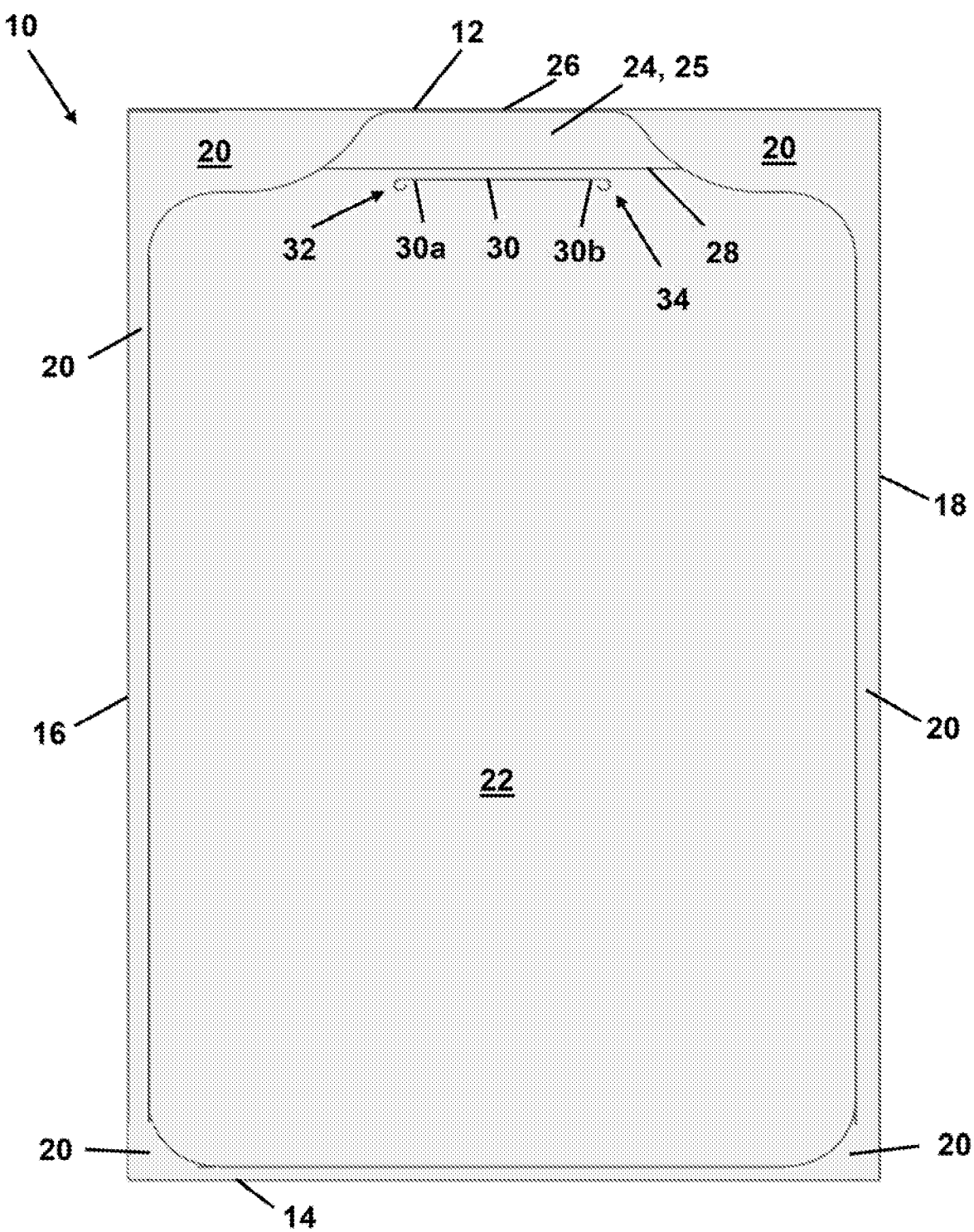
FIG. 1 is a schematic view of a first embodiment of a finger-proof package label according to the present application.

An embodiment of a finger-proof package label is formed with a linear or mostly linear slit or line of weakness proximate or otherwise adjacent the unsealed pull tab. As used throughout this application and as shown in the various figures, the term "linear" or "mostly linear" refers to a shape or geometry that is, of, relating to, denoting, or involving a straight line substantially throughout, traced by a point traversing in a constant direction and having an equation that may be written in slope-intercept form $y=mx+b$, where "m" is the slope and "b" is the y-intercept. The term "non-linear" is in contrast to the terms "linear" or "mostly linear." As used throughout this application, the term "non-linear" refers to a shape or geometry that is not a straight line substantially throughout, such that it has at least two dimensions and is traced by a point traversing in at least two directions. Non-limiting examples of non-linear shape include curved, curvilinear, arcuate, v-shaped, inverted v-shaped, w-shaped, inverted w-shaped, m-shaped, or bean-shaped. As used throughout this application and as shown in the various figures, the terms "proximate, "adjacent," or "otherwise adjacent" refer to being near, close, contiguous, adjoining, or neighboring in proximity. Such terms include but are not limited to being reasonably close to or in the vicinity of as well as touching, having a common boundary or having direct contact.

The slit or line of weakness prevents a person from placing a finger or other object underneath the pull tab and accessing or tampering with the package contents. If someone attempts to introduce a finger or another object underneath the pull tab, the tab will be forced upward, which increases the slit gap and causes the finger or other object to slide over the exterior (i.e., the outermost surface) of the package label instead of into the package.

In some embodiments, the slit may be a continuous line of weakness parallel to a side or boundary of the unsealed pull tab. In other embodiments, the slit may be a continuous line of weakness adjacent a boundary of the unsealed pull tab. As continuous, the line of weakness extends from a first end of the line of weakness to a second end of the line of weakness. The line of weakness may extend partially or completely through the entire thickness of the package label. In other embodiments, the slit may be a non-continuous line of weakness parallel to or adjacent a side or boundary of the unsealed pull tab. As known to a person of ordinary skill in the packaging arts, in the various embodiments, a line of weakness may comprise a continuous or discontinuous series of scores, holes, vents, slits, slots, perforations, notches, punctures, orifices, openings, inlets, channels, etc., in the surface of or through a layer or layers or the package label or may comprise a zone of an easy-tear material, such as an easy-tear sealant film. Lines of weakness may be formed by die-cut, laser, or other means known to a person of ordinary skill in the packaging arts.

In some embodiments, the slit or line of weakness may include a stopping feature at each end of the slit or line of weakness that prevents the package label from tearing when the package label is peeled using the pull tab. The stopping feature may be a curved shape, such as, as non-limiting examples, circle, partial circle, oval, teardrop, etc. In some embodiments, the stopping feature may curve away from the unsealed pull tab; in other embodiments, the stopping feature may curve toward the unsealed pull tab; in yet other embodiments, a stopping feature at one end of the slit or line of weakness may curve away from the unsealed pull tab and a stopping feature at the other end of the slit or line of weakness may curve toward the unsealed pull tab.

Referring to the drawings, with some but not all embodiments depicted, with elements depicted as illustrative and not necessarily to scale, and with the same (or similar) reference numbers denoting the same (or similar) features throughout the drawings, FIG. 1 is a schematic view of a first embodiment of a finger-proof package label according to the present application. Package label 10 comprises first edge 12, second edge 14 opposing first edge 12, third edge 16 substantially perpendicular to first edge 12 and second edge 14, and fourth edge 18 opposing third edge 16. Package label 10 further comprises first ply 20 and second ply 22. Each of first ply 20 and second ply 22 may comprise a monolayer film or a multilayer film. In other words, each of first ply 20 and second ply 22 may comprise one layer or multiple layers.

Second ply 22 comprises pull tab 24. Pull tab 24 comprises first boundary 26, second boundary 28 opposing first boundary 26, and, as pull tab 24 is unsealed, first adhesive deadener area 25 facilitating grasping of pull tab 24. First adhesive deadener area 25 may be positioned at any location on or throughout the interior surface (i.e., the innermost surface) of pull tab 24. In the embodiment of FIG. 1, first adhesive deadener area 25 is positioned throughout the interior surface of pull tab 24.

First boundary 26 of pull tab 24 is adjacent first edge 12. In some embodiments, such as that depicted in FIG. 1, first boundary 26 may be directly adjacent (i.e., in direct contact) with first edge 12. In other embodiments, the first boundary may be spaced apart from but still adjacent (i.e., in the proximity of, near, close, or neighboring in proximity to) the first edge.

In some embodiments, such as that depicted in FIG. 1, first boundary 26 of pull tab 24 is positioned at an approximate center of first edge 12. In other embodiments, the first boundary and the pull tab are not limited to a centered position and may be positioned at any location adjacent the first edge.

Second ply 22 also comprises slit or first line of weakness 30. In some embodiments, such as that depicted in FIG. 1, first line of weakness 30 is adjacent second boundary 28, specifically parallel to each of first boundary 26 and second boundary 28. In other embodiments, such as those where the first boundary is non-linear and the second boundary is linear, the first line of weakness may be adjacent the second boundary and parallel to the second boundary but not the first boundary. In yet other embodiments where each of the first boundary and the second boundary is nonlinear, the first line of weakness may be adjacent the second boundary but not parallel to either the first boundary or the second boundary. First line of weakness 30 is positioned apart from, i.e., separated from and not in the region of, pull tab 24, specifically (in the embodiment depicted in FIG. 1) first adhesive deadener area 25 of pull tab 24.

As described above, first line of weakness 30 is linear. First line of weakness 30 comprises first end 30a and second end 30b. In the embodiment depicted in FIG. 1, first line of weakness 30 is continuous from first end 30a to second end 30b. In other embodiments, the first line of weakness may be linear but discontinuous (such as, as a non-limiting example, formed from a series of linear, spaced apart slits). First stopping feature 32 is adjacent first end 30a of first line of weakness 30, and second stopping feature 34 is adjacent second end 30b of first line of weakness 30. As described above, first stopping feature 32 and second stopping feature 34 prevent second ply 22 of package label 10 from tearing when package label 10 is peeled (i.e., from a package as further described below) using pull tab 24.

In the embodiment of FIG. 1, each of first stopping feature 32 and second stopping feature 34 is curved shaped, and each curves away from pull tab 24. In other embodiments (such as that of FIG. 5 described below), each of the first stopping feature and the second stopping feature may be curved shaped, and each may curve toward the pull tab.

Figure 2:
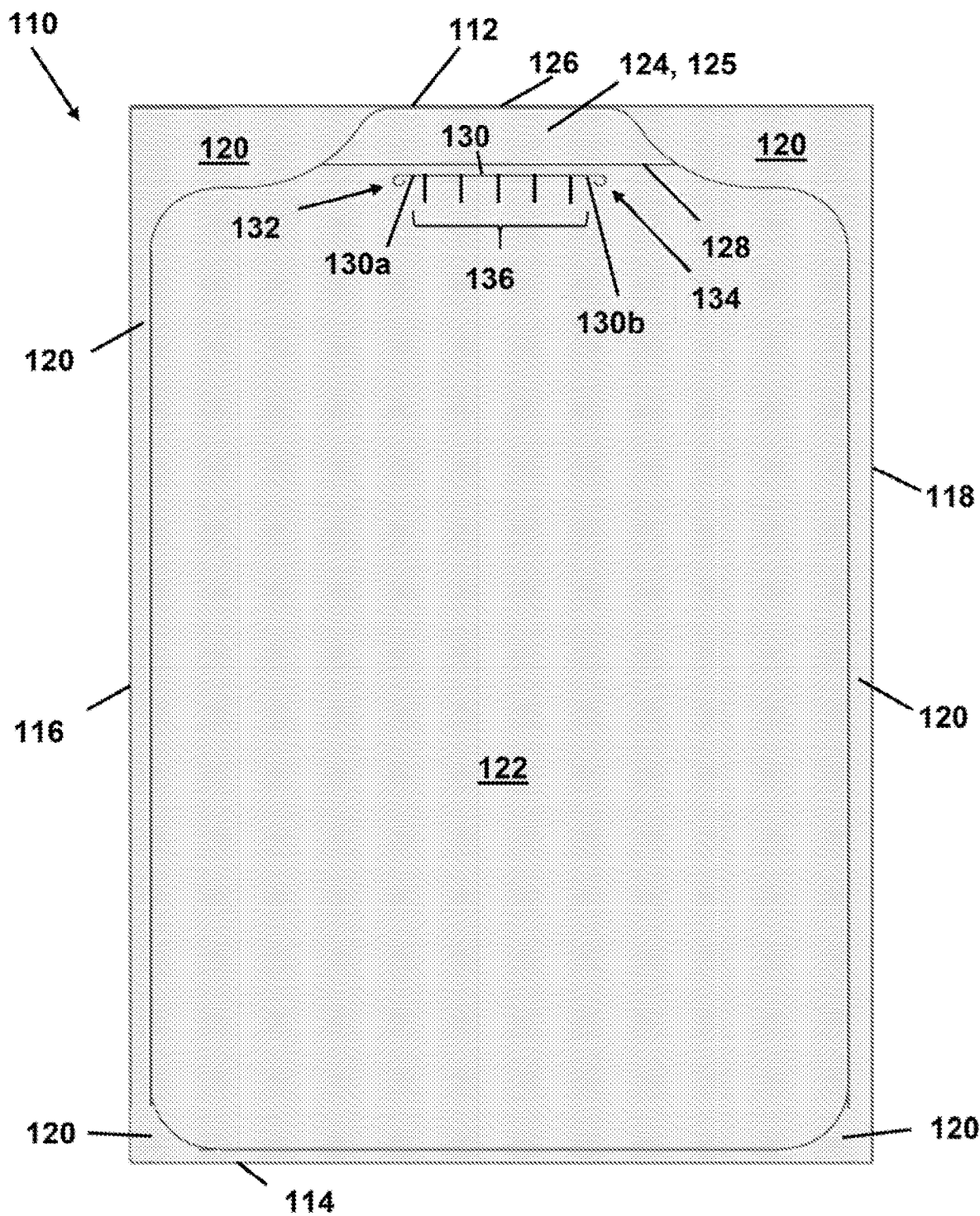
FIG. 2 is a schematic view of a second embodiment of a finger-proof package label according to the present application.

In a second embodiment as depicted in FIG. 2, the finger-proof label may further include a series of lines of weakness directly adjacent the first line of weakness and positioned on a side of the first line of weakness opposite the second boundary. FIG. 2 is a schematic view of a second embodiment of a finger-proof package label according to the present application. Package label 110 comprises first edge 112, second edge 114 opposing first edge 112, third edge 116 substantially perpendicular to first edge 112 and second edge 114, and fourth edge 118 opposing third edge 116. Package label 110 further comprises first ply 120 and second ply 122. As with first ply 20 and second ply 22 of package label 10 depicted in FIG. 1, each of first ply 120 and second ply 122 may comprise one layer or multiple layers.

Second ply 122 comprises pull tab 124. Pull tab 124 comprises first boundary 126, second boundary 128 opposing first boundary 126, and, as pull tab 124 is unsealed, first adhesive deadener area 125 facilitating grasping of pull tab 124. As above for the embodiment of package label 10 depicted in FIG. 1, first adhesive deadener area 125 may be positioned at any location on or throughout the interior surface (i.e., the innermost surface) of pull tab 124. In the embodiment of FIG. 2, first adhesive deadener area 125 is positioned throughout the interior surface of pull tab 124.

First boundary 126 of pull tab 124 is adjacent first edge 112. In some embodiments, such as that depicted in FIG. 2, first boundary 126 may be directly adjacent (i.e., in direct contact) with first edge 112. As above, in other embodiments, the first boundary may be spaced apart from but still adjacent (i.e., in the proximity of, near, close, or neighboring in proximity to) the first edge.

In some embodiments, such as that depicted in FIG. 2, first boundary 126 of pull tab 124 is positioned at an approximate center of first edge 112. In other embodiments, the first boundary and the pull tab are not limited to a centered position and may be positioned at any location adjacent the first edge.

Second ply 122 also comprises slit or first line of weakness 130. In some embodiments, such as that depicted in FIG. 2, first line of weakness 130 is adjacent second boundary 128, specifically parallel to each of first boundary 126 and second boundary 128. In other embodiments, such as those where the first boundary is non-linear and the second boundary is linear, the first line of weakness may be adjacent the second boundary and parallel to the second boundary but not the first boundary. In yet other embodiments where each of the first boundary and the second boundary is nonlinear, the first line of weakness may be adjacent the second boundary but not parallel to either the first boundary or the second boundary. First line of weakness 130 is positioned apart from, i.e., separated from and not in the region of, pull tab 124, specifically (in the embodiment depicted in FIG. 2) first adhesive deadener area 25 of pull tab 24.

As described above, first line of weakness 130 is linear. First line of weakness 130 comprises first end 130*a* and second end 130*b*. In the embodiment depicted in FIG. 2, first line of weakness 130 is continuous from first end 130*a* to second end 130*b*. In other embodiments, the first line of weakness may be linear but discontinuous (such as, as a non-limiting example, formed from a series of linear, spaced apart slits). First stopping feature 132 is adjacent first end 130*a* of first line of weakness 130, and second stopping feature 134 is adjacent second end 130*b* of first line of weakness 130. As described above, first stopping feature 132 and second stopping feature 134 prevent second ply 122 of package label 110 from tearing when package label 110 is peeled (i.e., from a package as further described below) using pull tab 124. In the embodiment of FIG. 2, each of first stopping feature 132 and second stopping feature 134 is curved shaped, and each curves away from pull tab 124.

Package label 110, specifically second ply 122 of package label 110, also comprises a series 136 of additional lines of weakness. In the embodiment depicted in FIG. 2, each additional line of weakness in series 136 is generally perpendicular to and directly adjacent the first line of weakness 130 and positioned on a side of first line of weakness 130 opposite second boundary 128 of pull tab 124. However, in other embodiments, each additional line of weakness in the series need not be perpendicular to the first line of weakness. In each embodiment, each additional line of weakness in the series is directly adjacent to the first line of weakness and positioned on a side of the first line of weakness opposite the second boundary of the unsealed pull tab. But, in various embodiments, each additional line of weakness in the series may form other than a 90° angle with the first line of weakness. As non-limiting examples, each additional line of weakness in the series may form a 30° angle with the first line of weakness, each additional line of weakness in the series may form a 150° angle with the first line of weakness, or half of the additional lines of weakness in the series may form a 30° angle with the first line of weakness and the other half of the additional lines of weakness in the series may from a 150° angle with the first line of weakness. The series of additional lines of weakness further prevents an object from being slid underneath the pull tab to access or tamper with the package contents prior to an end-user desiring to access the contents.

Figure 3:
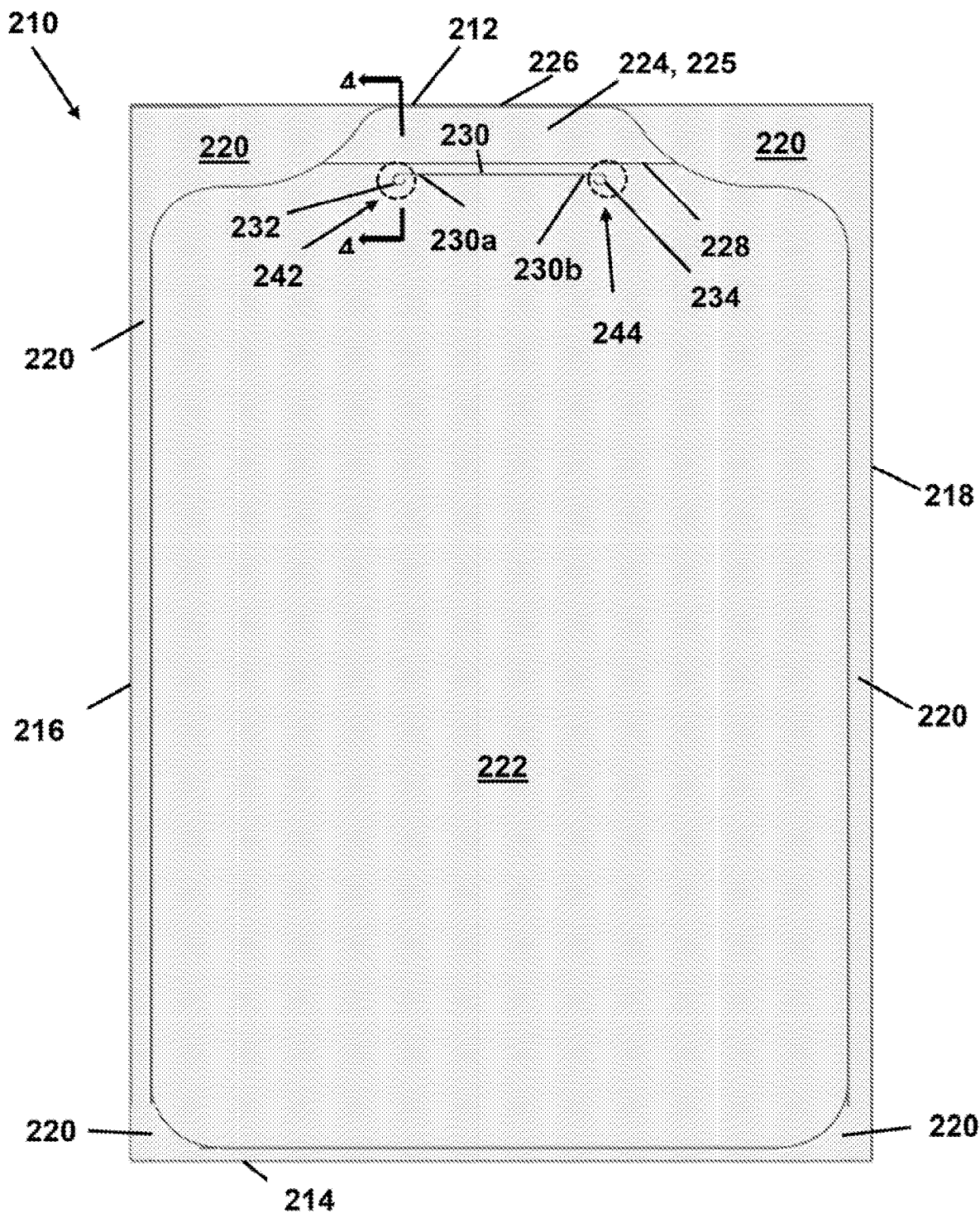
FIG. 3 is a schematic view of a third embodiment of a finger-proof package label according to the present application.

FIG. 3 is a schematic view of a third embodiment of a finger-proof package label according to the present application. Package label 210 comprises first edge 212, second edge 214 opposing first edge 212, third edge 216 substantially perpendicular to first edge 212 and second edge 214, and fourth edge 218 opposing third edge 216. Package label 210 further comprises first ply 220 and second ply 222. As with first ply 20 and second ply 22 of package label 10 depicted in FIG. 1 and first ply 120 and second ply 122 of package label 110 depicted in FIG. 2, each of first ply 220 and second ply 222 may comprise one layer or multiple layers.

Second ply 222 comprises pull tab 224. Pull tab 224 comprises first boundary 226, second boundary 228 opposing first boundary 226, and, as pull tab 224 is unsealed, first adhesive deadener area 225 facilitating grasping of pull tab 224. As above for the embodiment of package label 10 depicted in FIG. 1 and the embodiment of package label 110 depicted in FIG. 2, first adhesive deadener area 225 may be positioned at any location on or throughout the interior surface (i.e., the innermost surface) of pull tab 224. In the embodiment of FIG. 3, first adhesive deadener area 225 is positioned throughout the interior surface of pull tab 224.

First boundary 226 of pull tab 224 is adjacent first edge 212. In some embodiments, such as that depicted in FIG. 3, first boundary 226 may be directly adjacent (i.e., in direct contact) with first edge 212. As above, in other embodiments, the first boundary may be spaced apart from but still adjacent (i.e., in the proximity of, near, close, or neighboring in proximity to) the first edge.

In some embodiments, such as that depicted in FIG. 3, first boundary 226 of pull tab 224 is positioned at an approximate center of first edge 212. In other embodiments, the first boundary and the pull tab are not limited to a centered position and may be positioned at any location adjacent the first edge.

Second ply 222 also comprises slit or first line of weakness 230. In some embodiments, such as that depicted in FIG. 3, first line of weakness 230 is adjacent second boundary 228, specifically parallel to each of first boundary 226 and second boundary 228. In other embodiments, such as those where the first boundary is non-linear and the second boundary is linear, the first line of weakness may be adjacent the second boundary and parallel to the second boundary but not the first boundary. In yet other embodiments where each of the first boundary and the second boundary is nonlinear, the first line of weakness may be adjacent the second boundary but not parallel to either the first boundary or the second boundary. First line of weakness 230 is positioned apart from, i.e., separated from and not in the region of, pull tab 224, specifically (in the embodiment depicted in FIG. 3) first adhesive deadener area 225 of pull tab 224.

As described above, first line of weakness 230 is linear. First line of weakness 230 comprises first end 230*a* and second end 230*b*. In the embodiment depicted in FIG. 3, first line of weakness 230 is continuous from first end 230*a* to second end 230*b*. In other embodiments, the first line of weakness may be linear but discontinuous (such as, as a non-limiting example, formed from a series of linear, spaced apart slits). First stopping feature 232 is adjacent first end 230*a* of first line of weakness 230, and second stopping feature 234 is adjacent second end 230*b* of first line of weakness 230. As described above, first stopping feature 232 and second stopping feature 234 prevent second ply 222 of package label 210 from tearing when package label 210 is peeled (i.e., from a package as further described below) using pull tab 224. In the embodiment of FIG. 3, each of first stopping feature 234 and second stopping feature 234 is curved shaped, and each curves away from pull tab 224.

In the third embodiment as depicted in FIG. 3, package label 210 further includes additional areas of adhesive deadener, in addition to first adhesive deadener area 225 of pull tab 224. Specifically, second ply 222 further includes second adhesive deadener area 242 proximate or otherwise adjacent first end 230*a* of first line of weakness 230 and third adhesive deadener area 244 proximate or otherwise adjacent second end 230*b* of first line of weakness 230. In some embodiments, such as that depicted in FIG. 3, these additional adhesive deadener areas may be aligned with, adjacent, or otherwise in register with the stopping features, such as, as a non-limiting example, encircling or otherwise surrounding the areas of the stopping features. As depicted in FIG. 3, second adhesive deadener area 242 is adjacent first stopping feature 232, and third adhesive deadener area 244 is adjacent second stopping feature 234.

In FIG. 3, each of second adhesive deadener area 242 and third adhesive deadener area 244 is shown as dashed lines since, in this embodiment, each is internal to package label 210 (as described below in relation to FIG. 4). Second adhesive deadener area 242 and third adhesive deadener area 244 may prevent tearing of second ply 222 of package label 210 when package label 210 is peeled (i.e., from a package as further described below) using pull tab 224. Second adhesive deadener area 242 and third adhesive deadener area 244 may also prevent risk of contamination from chads. Without such adhesive deadener areas, chads may be formed by tearing at each of first stopping feature 232 and second stopping feature 234 when the label is peeled from a package. With adhesive deadener areas, chads are eliminated and no chads are formed upon opening.

As described above, the finger-proof label may be a monolayer label or a multilayer label. FIG. 4 is a schematic cross-sectional view of the label of FIG. 3, taken along line 4-4, i.e., through first adhesive deadener area 242. (While not shown in FIG. 3 with a specific line such as "4-4," the cross-sectional view of second adhesive deadener area 244 is similar to that described below.) In the embodiment of FIG. 4, the finger-proof label is a multilayer label comprising first layer 50, second layer 52, third layer 54, fourth layer 56, fifth layer 58, and sixth layer 60. Second ply 222 comprises first layer 50, second layer 52, third layer 54, fourth layer 56, fifth layer 58; and first ply 220 comprises sixth layer 60.

First layer 50 of second ply 222 may be an overlaminate layer or film or an abuse layer or film that withstands contact from other items or protects other layers of the label. In some embodiments, first layer 50 may comprise oriented polypropylene (OPP). In other embodiments, first layer 50 may comprise a multilayer film comprising OPP with a polyvinylidene chloride (PVdC) coating adjacent second layer 52.

Second layer 52 of second ply 222 may be an adhesive layer or tie layer securing first layer 50 to third layer 54 or fourth layer 56 or other layers of the label. In some embodiments, second layer 52 may comprise a UV adhesive.

Third layer 54 of second ply 222 may be an indicia layer and may comprise printing inks.

Fourth layer 56 of second ply 222 may be a label stock layer. The label stock layer may also be known as a carrier layer. In various embodiments, fourth layer 56 may comprise paper, nonwoven or woven material, latex material, plastic or thermoplastic material, foil, or other material as known to a person of ordinary skill in the packaging or label arts.

Fifth layer 58 of second ply 222 may be a removable adhesive layer. Removable adhesives are designed to form temporary bonds and can be removed after hours, days, months, or years. Some removable adhesives are designed to repeatedly separate and reattach. In this embodiment, the removable adhesive layer (i.e., fifth layer 58) of second ply 222 may be adapted to peelably reseal package label 210 to a package body (as further described below). A non-limiting example of a removable adhesive is a pressure sensitive adhesive, as described above. Non-limiting examples of pressure sensitive adhesives include but are not limited to those compositions that comprise a base elastomeric resin and a tackifier to enhance the ability of the adhesive to instantly bond and to enhance the bond strength. Examples of elastomers used as the base resin in tackified multicomponent pressure sensitive adhesives include but are not limited to natural rubber; polybutadiene; polyorganosiloxanes; styrene-butadiene rubber; carboxylated styrene-butadiene rubber; polyisobutylene; butyl rubber; halogenated butyl rubber; block polymers based on styrene with isoprene, butadiene, ethylene-propylene, or ethylene-butylene; or combinations of such elastomers. (See Yorkgitis, "Adhesive Compounds," Encyclopedia of Polymer Science and Technology, Third Edition, 2003, Volume 1, pp. 256-290 (John Wiley & Sons, Inc., Hoboken, N.J.).)

In embodiments prior to application of the label to a package, film layer or otherwise, sixth layer 60 (i.e., a layer of first ply 220) may be a release liner. In these embodiments, the release liner may be a paper, plastic, or thermoplastic carrier web material, any of which is coated on one or two sides with a release agent providing a release effect against the removable adhesive of fifth layer 58. The release agent may be solvent-based or water based and may be silicone, release varnish, release lacquer, or any other release agent.

In other embodiments, sixth layer 60 (i.e., a layer of first ply 220) may be a film layer. In these embodiments, the film layer may be thermoplastic and may be a monolayer film or a multilayer film. A non-limiting example of sixth layer 60 as a multilayer film is shown in Table 1.

TABLE 1

| Layer | Composition |
|---|---|
| Layer 1 | oriented polyethylene terephthalate (OPET) |
| Layer 2 | adhesive |
| Layer 3 | blend of low density polyethylene (LDPE) and linear low density polyethylene (LLDPE) |
| Layer 4 | anhydride-modified linear low density polyethylene (LLDPE) |
| Layer 5 | ethylene vinyl alcohol copolymer (EVOH) (e.g., with 38 mol % ethylene) |
| Layer 6 | anhydride-modified linear low density polyethylene (LLDPE) |
| Layer 7 | blend of low density polyethylene (LDPE) and linear low density polyethylene (LLDPE) |

As known to a person of ordinary skill in the packaging or label arts, the blend of LDPE and LLDPE in Layer 7 of this non-limiting example of sixth layer 60 may be considered a sealant layer, which may be considered to be a layer of film involved in the sealing of the film to itself or to another layer of the same or another film, sheet, etc. As further described below, in some embodiments, the sealant layer of sixth layer 60 may seal package label 210 to a package body, such as, as a non-limiting example, a tray.

Figure 4:
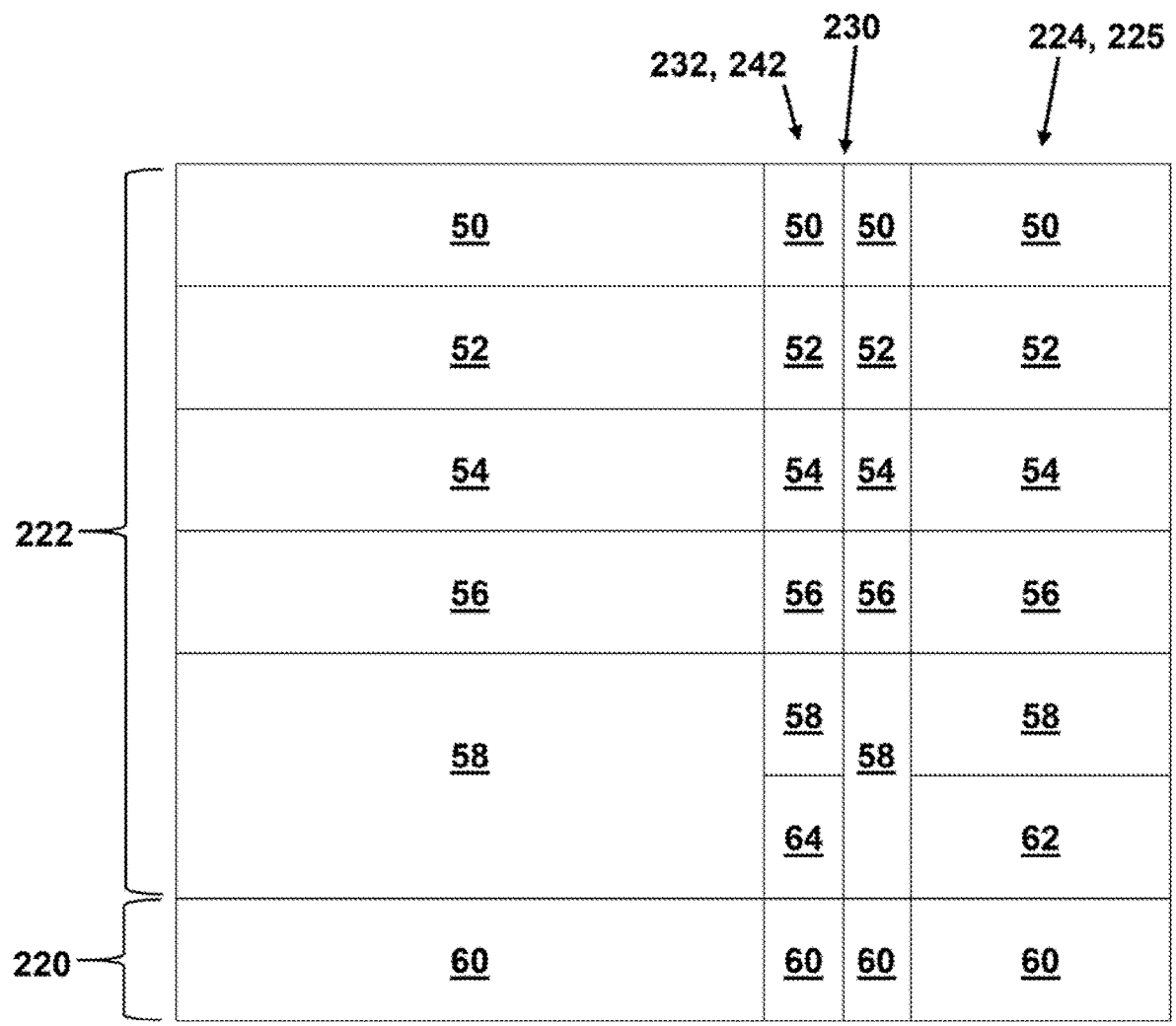
FIG. 4 is a schematic cross-sectional view of the label of FIG. 3, taken along line 4-4.

As depicted in FIG. 4, in the area of FIG. 3 along line 4-4, sixth layer 60 is coextensive with (i.e., having the same width as) the other layers of the label. However, as known to a person of ordinary skill in the packaging or label arts, in some embodiments such as those depicted in FIGS. 1-3, sixth layer 60 (i.e., a layer of first ply 220) may not be generally coextensive with the other layers of package label 210. First ply 220 may have a width greater than the width of second ply 222 if package label 210 is used as a lidstock or lidding film for, as a non-limiting example, a tray. In such embodiments, sixth layer 60 (i.e. a layer of first ply 220) may have a width that is greater than the width of the other layers to provide a margin for sealing the label to the tray (for example, via a sealant layer of sixth layer 60).

As described above, package label 210 may be placed on or sealed to a package to facilitate access to contents of a package. To permit access, sixth layer 60, as an interior layer (i.e., a layer comprising the innermost surface of package label 210) adjacent the package, may include a second line of weakness (such as, second line of weakness 372 depicted in FIG. 5). Sixth layer 60 of first ply 20 may comprise the second line of weakness. As with first line of weakness 30, 130, 230, the second line of weakness may comprise a continuous or discontinuous series of scores, holes, vents, slits, slots, perforations, notches, punctures, orifices, openings, inlets, channels, etc., in the surface of or through a layer or layers or the package label or may comprise a zone of an easy-tear material, such as an easy-tear sealant film, and the second line of weakness may be formed by die-cut, laser, or other means known to a person of ordinary skill in the packaging arts. The second line of weakness may be formed in various patterns to be consistent with patterns of permanent or removable (e.g., pressure sensitive) adhesive in a package label (including but not limited to in sixth layer 60 of first ply 222 of package label 210), as disclosed in, for example, U.S. Pat. No. 7,681,732 (Moehlenbrock et al.), U.S. Pat. No. 6,589,622 (Scott), U.S. Pat. No. 7,717,620 (Hebert et al.) or PCT International Publication Number 2015/002651 (Curwood, Inc.).

As depicted in FIG. 4, package label 210 also includes first section 62. First section 62 is designed to facilitate "deadening" of first adhesive deadener area 225 and grasping of pull tab 224. First section 62 facilitates "deadening" of pull tab 224 and the ability of an end-user to grasp pull tab 224 to open a package to which package label 210 is applied. First section 62 may comprise release agent (e.g., as described above), a removable adhesive with lower bond strength than the removable adhesive of fifth layer 58, no material (e.g., a "blank" area), or other materials. If the removable adhesive of fifth layer 58 is "flood coated," i.e., applied to the entirety of second ply 222 of package label 210, first section 62 may be positioned above or below (as depicted in FIG. 4) fifth layer 58, depending on the desired location of removable adhesive (as known to a person of ordinary skill in the packaging or label arts). If the removable adhesive of fifth layer 58 is "pattern applied," i.e., applied to less than the entirety of second ply 222 of package label 210, first section 62 may be adjacent but not above or below the removable adhesive of fifth layer 58 (not depicted).

As further depicted in FIG. 4, the label also includes second section 64. Second section 64 is designed to facilitate "deadening" of second adhesive deadener area 242. Second section 64 facilitates "deadening" of second adhesive deadener area 242 adjacent first stopping feature 232. Similar to first section 62, second section 64 may comprise release agent (e.g., as described above), a removable adhesive with lower bond strength than the removable adhesive of fifth layer 58, no material (e.g., a "blank" area), or other materials. The materials used for second section 64 may be the same as or different from the materials used for first section 62. If the removable adhesive of fifth layer 58 is "flood coated," i.e., applied to the entirety of second ply 222 of package label 210, second section 64 may be positioned above or below (as depicted in FIG. 4) fifth layer 58, depending on the desired location (as known to a person of ordinary skill in the packaging or label arts). If the removable adhesive of fifth layer 58 is "pattern applied," i.e., applied to less than the entirety of second ply 222 of package label 210, second section 64 may be adjacent but not above or below the removable adhesive of fifth layer 58 (not depicted).

Figure 5:
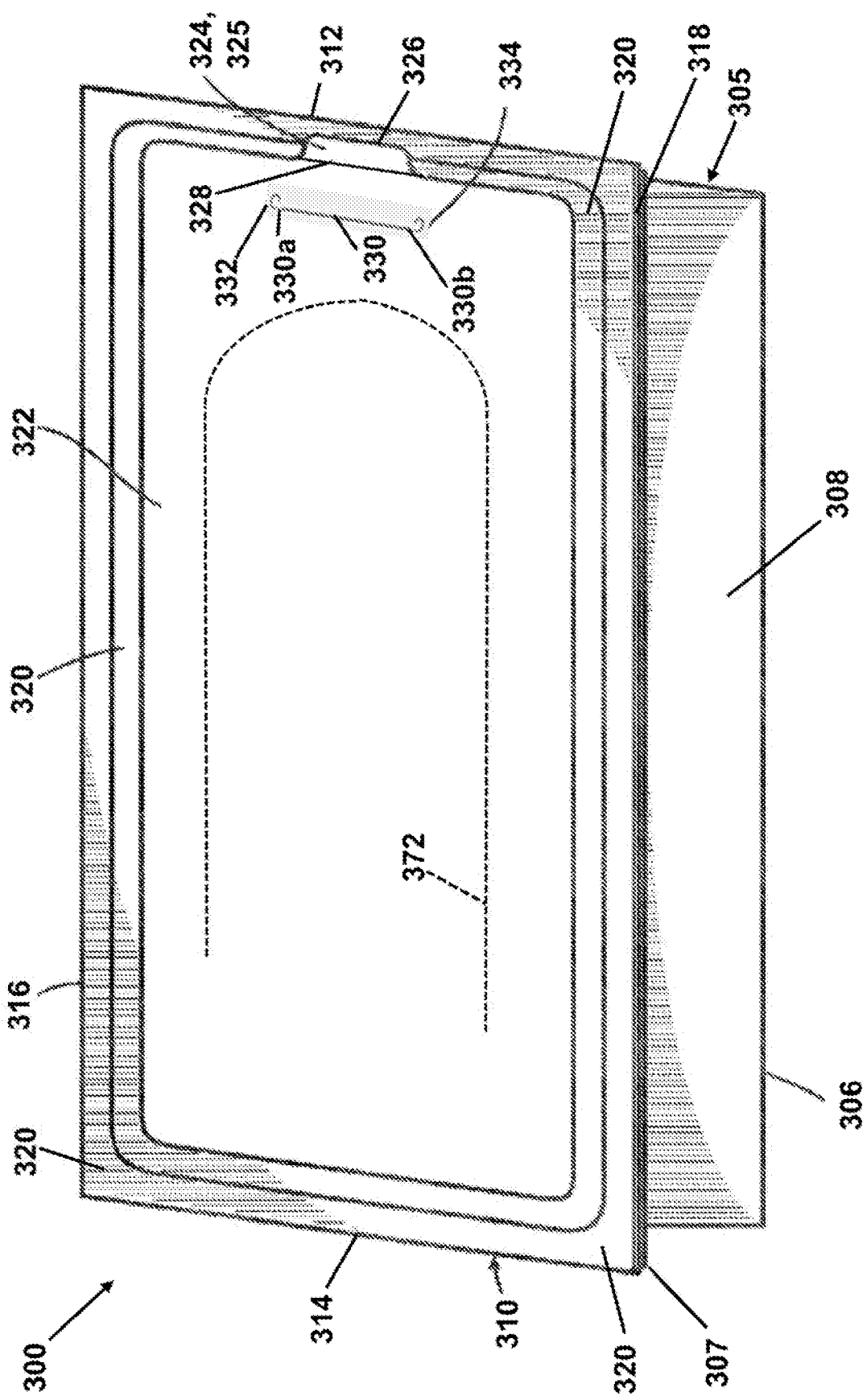
FIG. 5 is a partial perspective view of a package with an embodiment of a finger-proof package label according to the present application.

FIG. 5 is a partial perspective view of a package with an embodiment of a finger-proof package label according to the present application. Package 300 comprises package body 305 and package label 310.

In the embodiment of FIG. 5, package body 305 is exemplified as (as a non-limiting example) a tray. Package body 305 as a tray comprises bottom portion 306, top portion 307, and side portion 308 connecting bottom portion 306 to top portion 308. In some embodiments, top portion 307 may comprise a perimeter flange to facilitate sealing of package label 310 to package body 305.

Package label 310 comprises first edge 312, second edge 314 opposing first edge 312, third edge 316 substantially perpendicular to first edge 312 and second edge 314, and fourth edge 318 opposing third edge 316. Package label 310 further comprises first ply 320 and second ply 322. Each of first ply 320 and second ply 322 may comprise one layer or multiple layers.

Second ply 322 comprises pull tab 324. Pull tab 324 comprises first boundary 326, second boundary 328 opposing first boundary 326, and, as pull tab 324 is unsealed, first adhesive deadener area 325 facilitating grasping of pull tab 324. First adhesive deadener area 325 may be positioned at any location on or throughout the interior surface (i.e., the innermost surface) of pull tab 324. In the embodiment of FIG. 5, first adhesive deadener area 325 is positioned throughout the interior surface of pull tab 324.

First boundary 326 of pull tab 324 is adjacent first edge 312. In some embodiments, such as that depicted FIG. 5, first boundary 326 may be directly adjacent (i.e., in direct contact) with first edge 312. As above, in other embodiments, the first boundary may be spaced apart from but still adjacent (i.e., in the proximity of, near, close, or neighboring in proximity to) the first edge.

In some embodiments, such as that depicted in FIG. 5, first boundary 326 of pull tab 324 is positioned at an approximate center of first edge 312. In other embodiments, the first boundary and the pull tab are not limited to a centered position and may be positioned at any location adjacent the first edge.

Second ply 322 also comprises slit or first line of weakness 330. In some embodiments, such as that depicted in FIG. 5, first line of weakness 330 is adjacent second boundary 328, specifically parallel to each of first boundary 326 and second boundary 328. In other embodiments, such as those where the first boundary is non-linear and the second boundary is linear, the first line of weakness may be adjacent the second boundary and parallel to the second boundary but not the first boundary. In yet other embodiments where each of the first boundary and the second boundary is nonlinear, the first line of weakness may be adjacent the second boundary but not parallel to either the first boundary or the second boundary. First line of weakness 330 is positioned apart from, i.e., separated from and not in the region of, pull tab 324, specifically (in the embodiment depicted in FIG. 5) first adhesive deadener area 325 of pull tab 324.

First line of weakness 330 is linear. First line of weakness 330 comprises first end 330a and second end 330b. In the embodiment depicted in FIG. 5, first line of weakness 330 is continuous from first end 330a to second end 330b. In other embodiments, the first line of weakness may be linear but discontinuous (such as, as a non-limiting example, formed from a series of linear, spaced apart slits). First stopping feature 332 is adjacent first end 330a of first line of weakness 330, and second stopping feature 334 is adjacent second end 330b of first line of weakness 330. First stopping feature 332 and second stopping feature 334 prevent second ply 322 of package label 310 from tearing when package label 310 is peeled from package body 305 using pull tab 324. In the embodiment of FIG. 5, each of first stopping feature 332 and second stopping feature 334 is curved shaped, and each curves toward pull tab 324.

In some embodiments, package label 310 may not (as depicted) include additional areas of adhesive deadener. In other embodiments, package label 310 may include a second adhesive deadener area proximate or otherwise adjacent first end 330a of first line of weakness 330 and a third adhesive deadener area proximate or otherwise adjacent second end 330b of first line of weakness 330. The second adhesive deadener area may be adjacent first stopping feature 332, and the third adhesive deadener area may adjacent second stopping feature 332. As above, the second adhesive deadener area and the third adhesive deadener area, if included, may eliminate a chad at first stopping feature 332 and a chad at second stooping feature 334 (and, thereby, reduce the risk of product contamination) when the package label is peeled from the package body.

As depicted in the embodiment of FIG. 5, first ply 320 is not coextensive with second ply 322 but has a width that is greater than the width of second ply 322. This, in part, facilitates sealing of package label 310 to package body 320. First ply 320 comprises a sealant layer to seal package label 310 to top portion 307 (e.g., a perimeter flange) of package body (e.g., tray) 305.

First ply 320 also includes second line of weakness 372. As described above, second line of weakness 372 facilitates access to contents of package 300 when package label 310 is peeled from package body 305. When package label 310 is peeled (but not necessarily fully removed) from package body 305, layers of package label 310 separate at second line of weakness 372 to provide an opening to access contents of package 300.

If second ply 322 of package label 310 comprises a removable adhesive layer, package label 310 may be peelably resealed to package body 305 once an end-user removes the desired contents from package 300.

Each and every document cited in this present application, including any cross-referenced or related patent or application, is incorporated in this present application in its entirety by this reference, unless expressly excluded or otherwise limited. The citation of any document is not an admission that it is prior art with respect to any embodiment disclosed or claimed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application (including the appended claims) governs.

Unless otherwise indicated, all numbers expressing sizes, amounts, ranges, limits, and physical and other properties used in the present application (including the appended claims) are to be understood as being preceded in all instances by the term "about". Accordingly, unless expressly indicated to the contrary, the numerical parameters set forth in the present application (including the appended claims) are approximations that can vary depending on the desired properties sought to be obtained by a person of ordinary skill in the packaging arts without undue experimentation using the teachings disclosed in the present application.

As used in the present application (including the appended claims), the singular forms "a," "an," and "the" encompass embodiments having plural referents, unless the context clearly dictates otherwise. As used in the present application (including the appended claims), the term "or" is generally employed in its sense including "and/or," unless the context clearly dictates otherwise.

Spatially related terms, including but not limited to, "lower," "upper," "beneath," "below," "above," "bottom," and "top," if used in the present application (including the appending claims), are used for ease of description to describe spatial relationships of element(s) to another. Such spatially related terms encompass different orientations of the package in use or operation, in addition to the particular orientations depicted in the drawings and described in the present application (including the appended claims). For example, if an object depicted in the drawings is turned over or flipped over or inverted, elements previously described as below or beneath other elements would then be above those other elements.

The description, examples, embodiments, and drawings disclosed are illustrative only and should not be interpreted as limiting. The present invention includes the description, examples, embodiments, and drawings disclosed; but it is not limited to such description, examples, embodiments, or drawings. The reader should assume that features of one disclosed embodiment can also be applied to all other disclosed embodiments, unless expressly indicated to the contrary. Modifications and other embodiments will be apparent to a person of ordinary skill in the packaging arts, and all such modifications and other embodiments are intended and deemed to be within the scope of the present invention as described in the claims.

What is claimed is as follows:

1. A package label comprising a first ply, a second ply, and a first edge,
    wherein the second ply comprises
        a pull tab comprising a first boundary adjacent the first edge, a second boundary opposing the first boundary, and a first adhesive deadener area,
        a first line of weakness adjacent the second boundary and positioned apart from the first adhesive deadener area, wherein the first line of weakness is linear, and
        a first stopping feature adjacent a first end of the first line of weakness and a second stopping feature adjacent a second end of the first line of weakness.

2. The package label of claim 1 wherein the first line of weakness is continuous from the first end to the second end.

3. The package label of claim 1 wherein each of the first stopping feature and the second stopping feature is curved shape and each curves towards the pull tab.

4. The package label of claim 1 wherein each of the first ply and the second ply comprises multiple layers.

5. The package label of claim 4 wherein the second ply comprises a removable adhesive layer adapted to peelably reseal the package label to a package body.

6. The package label of claim 1 wherein the first boundary of the pull tab is positioned at an approximate center of the first edge.

7. The package label of claim 1 wherein the second ply further comprises a series of lines of weakness directly adjacent the first line of weakness and positioned on a side of the first line of weakness opposite the second boundary.

8. The package label of claim 1 wherein the first ply comprises a second line of weakness.

9. The package label of claim 1 wherein the first ply comprises a sealant layer adapted to seal the package label to a package body.

10. The package label of claim 1 wherein the second ply further comprises a second adhesive deadener area adjacent the first stopping feature and a third adhesive deadener area adjacent the second stopping feature.

11. The package label of claim 10 wherein the package label is adapted to eliminate a chad at the first stopping feature and a chad at the second stopping feature when the package label is peeled from a package body.

12. A package label of claim 1 wherein the first ply is not coextensive with the second ply.

13. A package comprising the package label of claim 1 wherein the package label is sealed to a package body.

14. The package of claim 13 wherein the package body is a tray.

15. A package label comprising a first ply, a second ply, and a first edge,
   wherein the second ply comprises
      a pull tab comprising a first boundary adjacent the first edge, a second boundary opposing the first boundary, and a first adhesive deadener area,
      a first line of weakness adjacent the second boundary and positioned apart from the first adhesive deadener area, wherein the first line of weakness is linear,
      a first stopping feature adjacent a first end of the first line of weakness and a second stopping feature adjacent a second end of the first line of weakness, and
      a second adhesive deadener area adjacent the first stopping feature and a third adhesive deadener area adjacent the second stopping feature.

16. The package label of claim 15 wherein the package label is adapted to eliminate a chad at the first stopping feature and a chad at the second stopping feature when the package label is peeled from a package body.

17. The package label of claim 15 wherein each of the first stopping feature and the second stopping feature is curved shape and each curves towards the pull tab.

18. The package label of claim 15 wherein the first ply comprises a second line of weakness.

19. A package comprising the package label of claim 15 wherein the package label is sealed to a package body.

20. A package label of claim 15 wherein the first ply is not coextensive with the second ply.

* * * * *